United States Patent
Andrade Garcia et al.

(10) Patent No.: US 11,687,520 B1
(45) Date of Patent: *Jun. 27, 2023

(54) SYSTEMS AND METHODS FOR APPLICATION DATA SERVERS

(71) Applicant: Appian Corporation, McLean, VA (US)

(72) Inventors: Antonio Andrade Garcia, McLean, VA (US); Rahul Swaminathan, McLean, VA (US); Vy Ton, McLean, VA (US); Erol Guven, McLean, VA (US); Ramsey Langley, McLean, VA (US); Brett Shomaker, McLean, VA (US); Johnny Uwe Debrodt Sarabia, McLean, VA (US)

(73) Assignee: Appian Corporation, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/403,474

(22) Filed: Aug. 16, 2021

Related U.S. Application Data (63) Continuation of application No. 17/111,429, filed on Dec. 3, 2020, now Pat. No. 11,113,269.

(51) Int. Cl.
| | |
|---|---|
| *G06F 7/00* | (2006.01) |
| *G06F 16/23* | (2019.01) |
| *G06F 9/54* | (2006.01) |
| *G06F 16/21* | (2019.01) |
| *G06N 20/00* | (2019.01) |

(52) U.S. Cl.
CPC .......... *G06F 16/2365* (2019.01); *G06F 9/543* (2013.01); *G06F 16/211* (2019.01); *G06N 20/00* (2019.01)

(58) Field of Classification Search
CPC ... G06F 16/2365; G06F 16/211; G06K 9/543; G06N 20/00
USPC .................................................. 707/600–899
See application file for complete search history.

(56) References Cited

U.S. PATENT DOCUMENTS

| | | | |
|---|---|---|---|
| 2003/0172368 A1 | 9/2003 | Alumbaugh et al. | |
| 2014/0215495 A1* | 7/2014 | Erich | G06F 11/3438 719/318 |
| 2017/0006135 A1* | 1/2017 | Siebel | H04L 67/12 |
| 2019/0068627 A1* | 2/2019 | Thampy | H04W 12/12 |

* cited by examiner

*Primary Examiner* — Isaac M Woo
(74) *Attorney, Agent, or Firm* — Finnegan, Henderson, Farabow, Garrett & Dunner, LLP (57) ABSTRACT

Described herein are methods, systems, and computer-readable storage media for automatic and efficient updating of databases and database schemas. Techniques include generating an identification of a task of an application associated with a database through a machine learning process for monitoring database activity. Further, patterns of the application's access to data stored in the database may be observed and provided along with the identified task to a feedback loop to identify changes in the application's access to data in a database. Techniques further include automatically updating a schema of the database based on the identified changes in the application's access to data stored in the database.

20 Claims, 6 Drawing Sheets

SYSTEMS AND METHODS FOR APPLICATION DATA SERVERS

CLAIM FOR PRIORITY

This application is a continuation of U.S. Non-Provisional patent application Ser. No. 17/111,429, filed on Dec. 3, 2020, which is expressly incorporated herein by reference in its entirety.

TECHNICAL FIELD

This disclosure relates to the automatic management, optimization, and utilization of databases. More specifically, this disclosure relates to systems and methods for automatic and efficient updating of database schemas in order to ease the management of the lifecycle of applications using the database, and to handle scaling with reduced or no application developer intervention.

BACKGROUND

When a software application that requires durable data persistence is designed and developed, it is typical to develop the data model and related database configurations to suit the needs of that specific software application. A data model can be reflected by a set of fields and relationships among those fields in a database, those fields and relationships being used to provide specific application functionality.

In these cases, the data model is defined as a schema or set of schemas with a fixed physical structure, which includes the layout of the data in tables on the primary storage location, such as the hard disk or memory (e.g., RAM). The initial data model design and database configurations are driven by the requirements of the software application under development. Such a database may be able to be optimized for the initial requirements, but oftentimes the design choices are made and implemented before the complete functionality of the application has been developed or even envisioned. Application programming logic, i.e., code, is written to use the specific data model that is implemented.

As applications are developed iteratively over time, and the patterns of data access and underlying data models change, different steps must be taken to optimize the physical structure of the data. Once the data model, including relationships between fields, is created, and application programming is developed to rely on a particular data model, it can be difficult and time-consuming to change the model because changes both to the database structure and application programming code must be altered. And when the data model is changed because application requirements are changed, oftentimes, developers of the application or database overlook the necessary steps to re-optimize the database based on an application's new data requirements. In other cases, such re-optimization is recognized, but requires substantial effort and risk, requiring schema changes and data migrations.

In other scenarios, databases are tied to software applications designed for particular vertical markets or industries, such as finance, healthcare, or social networking, resulting in additional specialized data models and database configurations. Databases used by applications in these vertical markets or industries may offer some domain-specific optimizations for evolving vertical-specific applications, but those optimizations may not be ideal for applications that are not written for that vertical market but still draw data from the underlying database. Furthermore, databases that are optimized for particular use cases generally produce suboptimal results when they are queried by applications that are designed for a different use case. Typically, this results in implementing extraction, loading, and transformation processes that copy data from one database to another in order to optimize the schemas and database configurations for each disparate application use case, incurring a tradeoff between performance and real-time data consistency. It becomes effectively impossible to optimize a particular database for all applications when the underlying data may be used by applications developed for diverse business domains, and especially when the application developers do not know all of the applications' data persistence and use cases a priori.

A significant limitation for most application-based schemas, thus, is that the database schema is fixed and cannot be changed without significant modifications to both the application accessing the database (e.g., by changing its code or its functionality) and the data itself (e.g., through data migration). Sometimes, it is impossible to change the physical schema in a way that would be required for a particular application change because other applications may require a particular configuration of the physical schema. In addition, the flexibility of changes to the physical schema of a database may be limited by the capabilities of the underlying database technology itself. In such scenarios, automatic updating the physical schema of the database, i.e., the layout of the data, whether on disk or in memory, to optimize use case-specific data access patterns (e.g., write processing patterns or query processing patterns) may be greatly beneficial. Certain systems may optimize database access by predefining the physical schema to handle specific data access patterns. The pre-definition of physical schemas, however, may impose limitations on application design or performance. For instance, it may limit which tables of the database can be accessed, how they are accessed, how performant the data access is, or how stale the data may be. A system that can automatically update the physical database schema based on observed data access patterns would be vastly more beneficial. Automatic updating of physical schemas can be accomplished, for instance, by automatically replicating or partitioning existing database tables or columns on the same or different database servers, or creating or modifying database tables or columns. Automatic updating of logical schema can be accomplished, for instance, by creating or modifying logical databases and logical tables that combine data from existing physical tables, accessed by a particular application, in ways that are not reflected in the application model (e.g., data fields and relationships that are assumed to exist by the application), but instead are reflected in the particular data access patterns of that application.

Accordingly, as described above, there are several technological deficiencies in the art that give rise to a need for automated database management, optimization, and utilization techniques. There are technological needs for approaches that can automatically, without human analysis or intervention, update a physical or logical schema based on the type of data and particular queries executed by an application that utilizes the database. Such database management, optimization, and utilization techniques should advantageously adapt to the evolution of the functionality of an application in terms of its use and how it is developed over time (e.g., both in terms of changed usage patterns in an application whose functionality has not changed but user behaviors have changed, as well as changed application functionality that results from ongoing application development whether or not accompanied by changes in user behaviors), automatically manage the database itself, and avoid the problems of slow and inefficient access to data, such as unnecessary memory usage, unnecessarily slow data transfer, unnecessary duplication of data, and avoiding stale copies of duplicated data. Overcoming these problems traditionally requires manual analysis by database and application experts, manual schema redesign, and data migration. The disclosed embodiments herein seek to automate these steps with the benefits of reducing the burden on application and database developers and permitting application functionality to evolve automatically without the need to manually modify the underlying physical schema of the database.

SUMMARY

Certain embodiments of the present disclosure relate to a non-transitory computer readable medium, including instructions that when executed by at least one processor cause the at least one processor to perform operations for automatic and efficient updating of a database. The operations may include generating, through a machine learning process, an identification of a task of an application associated with the database, wherein the machine learning process includes monitoring activity of the application that accesses the database; determining patterns of the application's access to data stored in the database; providing the identified task and the observed data access patterns of the application to a feedback loop; identifying changes in the application's access to data stored in the database from the feedback loop; and automatically updating a physical or logical schema of the database based on the identified changes in the application's access to data stored in the database from the feedback loop.

According to some disclosed embodiments, the changes in the application's access to data stored in the database include a change in one or more of: the set of data fields accessed by the application, the filters applied to the data accessed by the application, the sort order of the data, ways in which the data is grouped, ways in which the data is aggregated, ways in which the data is transformed by functions, setting paging parameters for the data, ways transactions are batched, and ways in which query results are limited.

According to some disclosed embodiments, the changes in the application's access to data stored in the database include a change in one or more of the observed patterns.

According to some disclosed embodiments, the change in one or more of the observed patterns includes an increased frequency of access to the data by the application. One example of this increased frequency of access to the data may occur when an increased number of users or applications use the application that accesses the data. Another example of increased frequency of access to the data may occur when some tables or sets of fields in the same or different tables are accessed more frequently than they were previously.

According to some disclosed embodiments, the change in one of the observed patterns includes an increased number of accesses to one or more data fields of the database.

According to some disclosed embodiments, the automatically updating the physical schema of the database includes the ability to respond to increased load (e.g., an increase in the number of accesses to the database) by creating replica copies of one or more data fields or processes to access those data fields, a technique commonly known as horizontally scaling, based on the identified changes in the application's access to data stored in the database from the feedback loop. Horizontal scaling, also called replication, can be accomplished in the context of a single server or, in the case of a distributed deployment of the database, on multiple servers. Replicating copies of data fields can be accomplished, for instance, by creating a duplicate copy on the same server or on another server (or servers) with those copies remaining accessible to the original application. Replicating processes can be accomplished, for instance, by creating a duplicate copy of a process which accesses the data fields on the same server or on another server (or servers).

According to some disclosed embodiments, the horizontal scaling is performed dynamically and uniquely for a particular application, for instance based on observed data access patterns of that application.

According to some disclosed embodiments, automatically updating the database includes creation of a logical table to access the data stored in the database.

According to some disclosed embodiments, automatically updating the database includes creation of a physical table to access the data stored in the database.

According to some disclosed embodiments, the creation of the physical table occurs when the rate of accesses of a logical table is above a threshold.

According to some disclosed embodiments, the creation of the physical table occurs when the percentage of times a particular set of data fields are accessed together is above a threshold.

According to some disclosed embodiments, the change in one of the observed data access patterns includes a decreased number of accesses to one or more data fields of the database. Based on this observation, the present invention is able to automatically remove replicated data fields or processes that were created during a previous instance of horizontal scaling.

According to some disclosed embodiments, the identifying changes in the application's access to data stored in the database from the feedback loop includes identifying changes in the application's access at the level of individual data fields in the database.

According to some disclosed embodiments, the automatically updating of the physical or logical schema is performed while simultaneously preserving a record of the changes to the schema. This preserved record provides an advantage because it permits auditing of changes to the database at all points in time in the past. The preserved record provides a further advantage because it permits the ability to query against or rollback to any historical state of the data at any point in the past.

According to some disclosed embodiments, the automatically updating of the physical or logical schema is performed while simultaneously allowing uninterrupted, concurrent access to the data, i.e., not requiring a database control lock. Thus, users of the application can continue to use it to retrieve data from the database while the present invention is automatically updating the physical or logical schema unbeknownst to the users.

According to some disclosed embodiments, the identifying changes in the application's access to data stored in the database from the feedback loop includes identifying a change in a relationship between one or more data fields of the database, for instance due to the addition or removal of related data fields.

According to some disclosed embodiments, the identifying changes in the application's access to data stored in the database from the feedback loop includes identifying a change in a bi-directional relationship that is based on a data in a first data field in a first row in a first table of the database and a data in a second data field in a second row in a second table of the database.

Certain embodiments of the present disclosure relate to a computer-implemented method for automatic and efficient updating of a database. The method may include generating, through a machine learning process, an identification of a task of an application associated with the database, wherein the machine learning process includes monitoring activity of the application involving the database; observing patterns of the application's access to data stored in the database; providing the identified task and the determined patterns of the application to a feedback loop; identifying changes in the application's access to data stored in the database from the feedback loop; and automatically updating a physical or logical schema based on the identified changes in the application's access to data stored in the database from the feedback loop.

According to some disclosed embodiments, the change in the relationship between one or more data fields of the database includes an addition or removal of one or more data fields from the application model.

According to some disclosed embodiments, the automatically updating of a logical schema includes updating a logical structure pointing to a physical schema.

According to some disclosed embodiments, the database server may include separate tables for each data field of the physical schema, separate tables for sets of related data fields, separate tables for sets of unrelated data fields that are commonly accessed together, or separate tables for subsets of the data for any of the foregoing.

Certain embodiments of the present disclosure relate to a database management system configured for automatic and efficient updating of a database. The database management system may include a database, and one or more processors configured to execute software instructions to perform operations for updating the database. The operations may include generating, through a machine learning process, an identification of a task of an application associated with the database, wherein the machine learning process includes monitoring activity of the application involving the database, determining patterns of the application's access to data stored in the database, providing the identified task and the observed patterns of the application's access to a feedback loop, identifying changes in the application's access to data stored in the database from the feedback loop, and automatically updating a schema of the database based on the identified changes in the application's access to data stored in the database from the feedback loop.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Systems and methods consistent with the present disclosure are directed to automatic management, optimization, and utilization of databases. In some embodiments, the automated management of the database may include options for database field-level granularity, and isolation of data from the database schema and dynamic scaling to handle increased load. As described below, these techniques of automatic database management result in technological improvements in improving the speed of accessing data by applications, reducing the amount of memory utilized in copying accessed data, and allowing for multiple applications to share data.

Figure 1:
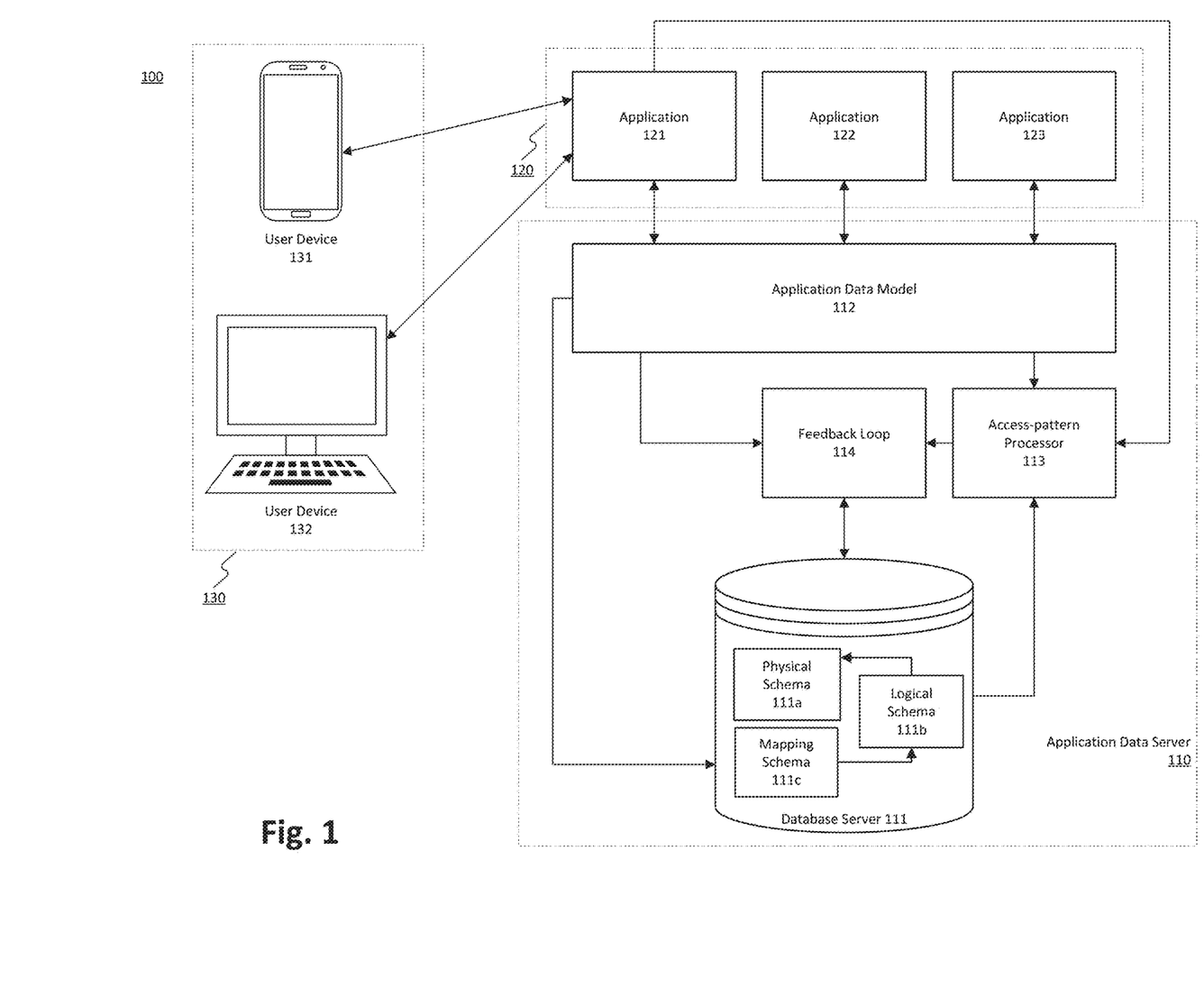
FIG. 1 is a block diagram depicting an exemplary system to update physical or logical database schemas automatically, according to some embodiments of the present disclosure.

FIG. 1 is a block diagram depicting an exemplary system 100 to update physical or logical database schemas automatically, according to some embodiments of the present disclosure. The system 100 may comprise an application data server (ADS) 110 managing the one or more databases accessed via one or more applications among application group 120 by devices 130 (e.g., computer 132, mobile device 131, etc.). The ADS 110 may comprise a database server 111 containing one or more databases, each database having logical and physical schema that enables storing data in one or more database tables. The model of multiple database tables and their relationship to each other may be abstracted by application data model 112, which can be used to query data from and save data to tables in one or more physical schema on one or more database servers 111. Thus, while data exposed by an application data model 112 may appear as a single collection of data in one record, that data may reside in multiple tables, connected by unexpressed and/or optionally transient relationships, existing on the database server 111. Furthermore, database server 111 may exist on a single server or distributed across multiple servers.

The ADS 110 may log database access requests to the tables or fields in the tables using access-pattern processor 113. The access-pattern processor 113 may log both individual access to tables and a combination of tables accessed as views or logical tables. In some embodiments, the access-pattern processor 113 may also record the source of the database access requests. The source of the database access requests may include, for example, an application function making a call to the database for certain data. The access-pattern processor 113 may record the fields in tables accessed via the application data model 112 or tables and fields in tables defined by the database tables on the database server 111. The structure of database tables in database server 111 may be defined using physical schema 111a and logical schema 111b. The physical schema 111a may define the storage of data in the database tables of the database server 111. The logical schema 111b may represent one or more relationships between various fields of data in database tables. For example, in some embodiments, the logical schema 111b may include only data relationships which are different from the data relationships defined in the physical schema 111a. In some embodiments, the logical schema 111b may include all the relationships between fields of data in database tables of the database server 111. Logical tables in the present invention enable a diverse set of tasks or applications, each of which requires different optimizations to efficiently read and write data, to use the same data and may not be impacted by changes to the physical schema by one of the tasks.

As described herein, a data field may be a piece of information. Data fields can be explicitly defined by the application model (e.g., the "First Name" of a "Person" data model) or implicitly defined by the application data access patterns (e.g., through derived information defined by queries). Data fields may be mapped to one or more columns (e.g., storage locations) in one or more physical schemas 111a through one or more logical schemas 111b (e.g., multiple logical schemas 111b may refer to the same physical schema 111a). One data field may be mapped to multiple columns, for example, when it is derived from one or more data fields in one or more physical schemas 111a. One data field may also be mapped to multiple replica copies of the same column. A column, as described herein, may refer to the physical storage location of a data field. Copies of the same column may be known as replica copies of a data field.

Logical schema 111b may be created one or more ways by system 100. For example, logical schema 111b may be created upon generation of application (e.g., application 121) and definition of the data model in the application data model 112. A logical schema 111b may be created as a copy of the application data model 112, as described by application 121. A relationship between the logical schema 111b and the application data model 112 may be maintained using a mapping schema 111c. The mapping schema 111c may create a copy of the application data model 112 in the logical schema 111b upon the creation of the application data model 112. A logical schema 111b may maintain the relationships described above based on the mapping schema 111c. Logical schema 111b may also be created and/or updated when a query is generated by the application 121 to access the data present in database server 111 using the application data model 112. The updates to logical schema 111b may propagate to the physical schema to scale queries generated by application 121 to access data from database server 111. The process of logical schema 111b's generation based on the application 121 queries is described further in connection with FIGS. 3 and 4 below.

The access-pattern processor 113 may operate on access patterns (e.g., an access patterns log) stored in a file system locally on secondary storage or a cloud file system (e.g., AMAZON S3, AZURE STORAGE, GOOGLE CLOUD STORAGE, etc.). In some embodiments, the access patterns may be stored in the database server 111 in a separate database. The data in database server 111 may also be stored locally on a secondary storage or a cloud file system (e.g., AMAZON S3, AZURE STORAGE, GOOGLE CLOUD STORAGE, etc.). The database server 111 may include pointers to the data stored in various locations. The data may be present on or more servers and accessed through the database server 111.

The access patterns log may be archived at regular intervals (e.g., daily, monthly, weekly, etc.) or upon receiving a defined number of the database access requests, and in some embodiments may only include the latest set of access patterns. The latest access patterns analyzed by access-pattern processor 113 may reside in memory for quick and easy access. The archived access patterns, in that situation, may reside in the database server 111.

In various embodiments, the database server 111 may take several different forms. For example, database server 111 may be an SQL database or NoSQL database, such as those developed by REDIS, ORACLE, CASSANDRA, MYSQL, KDB+, or various other types of databases. Accordingly, the database server 111 may be a relational or non-relational database, and may be a row database or a columnar database. In addition, database server 111 may be distributed across multiple physical servers, or centralized at a single server.

Database server 111 may store data that is used in the operation of applications, such as application 121. For example, if application 121 is configured to provide statistics regarding a professional sport, database server 111 may store historical data relating to past games, athletes, and teams, etc. Similarly, if application 121 is configured to provide human resources functionality within an organization, database server 111 may store data relating to employees, benefits information, salary information, evaluation data, and similar data. In some embodiments, database server 111 may be fed data from an external source (e.g., server, database, sensors, IoT devices, etc.). The external data may be copied into the database server 111 or may be pointed in the database tables in the database server 111. For example, the database server 111 may include URLs to remote data stored on a file system or cloud storage (e.g., AMAZON S3, AZURE STORAGE, GOOGLE CLOUD STORAGE, etc.). The external data may be accessed directly over a network protocol (e.g., HTTP) or may require usage of an API.

A feedback loop 114 may be configured to evaluate the access patterns logged by access-pattern processor 113 to determine if a logical or physical structure (e.g., logical schema 111b or physical schema 111a) defined in the database server 111 needs to be updated. For example, feedback loop 114 may update the physical schema 111a of a database on the database server 111. Updating the schema may include splitting a table into multiple tables or merging fields of different tables to form new tables. In some embodiments, feedback loop 114 may update a physical schema 111a or logical schema 111b when changes in access patterns are causing the ADS 110 to perform inefficiently. The feedback loop 114 may update a physical or logical schema when, for example, a new task associated with one or more access patterns generated by creating a new software application function or updating an existing software functions is observed. In some embodiments, the feedback loop 114 may observe data access patterns associated with the new task for a certain period of time since the first observation of those data access patterns before updating the physical or logical scheme. In some embodiments, the feedback loop 114 may update a physical schema 111a or logical schema 111b only after observing the new task a certain number of times (e.g., a threshold number). In some embodiments, the feedback loop 114 may update a physical schema 111a or logical schema 111b only after a particular metric crosses a threshold, e.g., particular columns are accessed together a given percentage of the time that one or more tables are queried. The feedback loop may apply artificial intelligence to determine which metrics to use and what threshold number must be crossed before updating the physical or logical schema. For example, artificial intelligence could be used to identify patterns of increased or decreased usage of the data and respond accordingly, for instance by creating additional physical replicas of data (i.e., scaling) during times or periods of high usage and removing those replicas during times or periods of low usage. In some embodiments, the feedback loop 114 may also observe the effect on the execution time or increase in usage of memory prior to requesting the update to the physical or logical schema. The artificial intelligence may predict access patterns over particular periods of time and make recommendations. For example, the artificial intelligence may notice that the access pattern may occur during a certain time of day and may recommend the system 1000 to scale down replicas during that time by removing or updating physical schema 111a or logical schema 111b. Various artificial intelligence or machine learning tools may be utilized in the above techniques, such as GOOGLE AI HUB, GOOGLE AUTOML TABLES, GOOGLE CLOUD INFERENCE API, AMAZON SAGEMAKER, AZURE MACHINE LEARNING, TENSORFLOW, etc.

Memory for feedback loop 114 and database server 111 may be implemented in several ways. For example, in various embodiments the memory may be implemented in Dynamic RAM (DRAM), Static RAM (SRAM), Z-RAM, Advanced-RAM (A-RAM), Synchronous Dynamic RAM (SDRAM), Double Data Rate SDRAM (DDR SDRAM), Graphics DDR SDRAM (GDDR SDRAM), Flash, or other types of memory.

In system 100, the access-pattern processor 113 may record database access requests to the database server 111 from one or more applications among application group 120. Application group 120 may include multiple applications, e.g., applications 121-123, each accessing data in the database server 111 by sending database access requests to ADS 110. The access-pattern processor 113 may include a predefined number of access patterns per each application that accesses data in the database server 111. Application group 120 may pass a calling function signature along with data being requested. In some embodiments, an application's request for data may result in two or more calls, such as: (1) a call to the application data model 112 to access data in the database server 111, and (2) a call to the access-pattern processor 113 to record an access pattern of the database request. ADS 110 may behave differently based on an application making a database access request. The difference in ADS 110 behavior per application may be based on, for example, the priority of the database access request or a type of service registered with the ADS 110. The difference in ADS 110 behavior may include the number of access patterns logged by access-pattern processor 113.

Applications with no logging and automatic optimizations may result in application data model 112 forwarding the data access requests to database server 111 directly. In some embodiments, the different behavior may be based on the particular type of application. For example, application 122 may be a legacy application with consistent daily database access patterns and a database schema that has remained stable for years, resulting in no logging of access patterns. Application 121, on the other hand, may be an application undergoing continuous iterative development with significant, frequent changes to the functionality resulting in evolving data access patterns, requiring keeping track of application model changes, new reports, or database calls requesting new sets of data from database server 111, and thus may require keeping track of access patterns and automatically updating the database schema (physical schema 111a or logical schema 111b) based on those application changes.

Applications in application group 120 may make requests to ADS 110 that may first be processed by application data model 112. Application data model 112 may make multiple calls to the database server 111, the access-pattern processor 113, and the feedback loop 114 for each request from the applications in application group 120. In some embodiments, however, the application data model 112 may skip one or more of the calls to feedback loop 114 or access-pattern processor 113. In some embodiments, the database server 111 may make the calls to the access-pattern processor 113 and the feedback loop 114 upon receiving a call from the application data model 112. The database server 111 and the application data model 112 may make calls to the access-pattern processor 113 and the feedback loop 114 at regular intervals or after a set number of database access requests. The wait time or the number of database access requests sent to access-pattern processor 113 may depend on the particular application among applications in application group 120.

User devices 130 may make a request to access certain data to the applications 120. Applications in application group 120 may need to execute one or more functions to retrieve data requested by user devices 130. The execution of the functions may result in database access requests sent by the applications in application group 120 to ADS 110. The database access requests sent by applications in application group 120 may depend on the type of user device 130 making a data request. For example, user devices 131 and 132 accessing the same service may result in different sets of functions of application 121 executed by a processor to show different content based on the available screen resolution and configuration. For instance, if user device 131 is a mobile device and the application requests and displays less content than when the application is displayed on a non-mobile device, and the application is more frequently displayed on a mobile device, the access-pattern processor 113 may recognize that the mobile application regularly accesses a similar set of data and update physical schema 111a or logical schema 111b to permit more efficient access to that data, for instance by creating a new table or view with only those columns accessed by the application for mobile devices. In addition, in some embodiments, applications in application group 120 may be accessed by other automated applications without the direct involvement of a user. This may occur, for example, in IoT (internet of things) environments, virtualized computing environments (e.g., involving instantiated virtual machines, containers, or serverless code instances), or in other environments involving application-to-application communications.

The user device 130's requests for access to data to applications in application group 120 may be sent over a network. The network may take various forms. For example, the network may include or utilize the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, or other types of network communications. In some embodiments, the network may include an on-premises (e.g., LAN) network, while in other embodiments, a network may include a virtualized (e.g., AWS™, Azure™, IBM Cloud™, etc.) network. Further, the network may in some embodiments be a hybrid on-premises and virtualized network, including components of both types of network architecture.

Figure 2A:
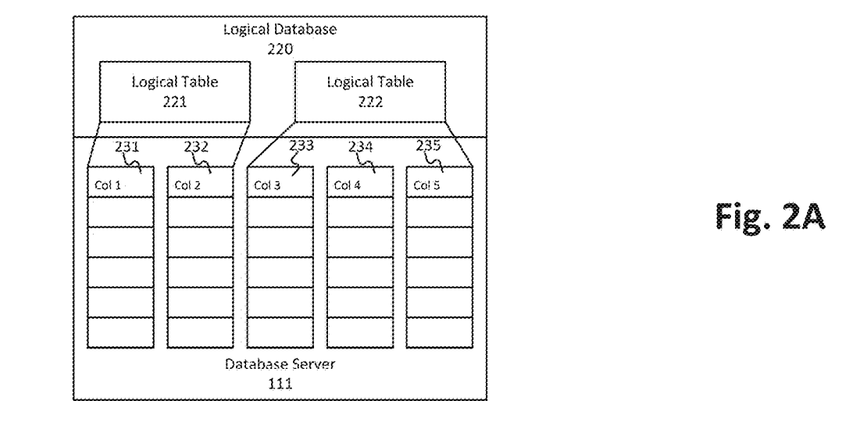
FIGS. 2A and 2B are exemplary database structures showing relationships between a database server and logical databases accessed by applications, according to some embodiments of the present disclosure.
Figure 2B:
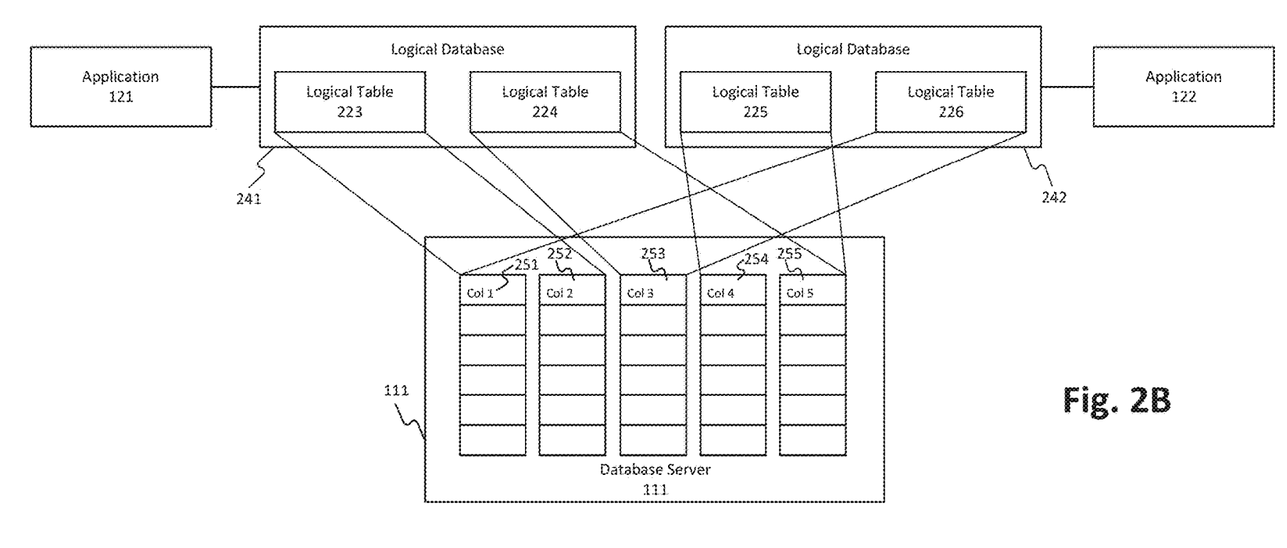

FIGS. 2A and 2B are exemplary database structures showing the relationship between the database server 111 and logical databases 241 and 242 accessed by applications 121 and 122, according to some embodiments of the present disclosure. The database server 111 (shown in FIG. 1 and discussed above) may maintain one or more logical databases 220, each having a logical schema (e.g., logical schema 111b) that defines, in logical tables, the relationships between various fields of data stored in the database server 111. As illustrated in FIG. 2A, a logical database 220 may maintain the relationships of various fields whose values are stored in physical structures of the database, e.g., columns 231-235 in the database server 111. The logical database 220 may maintain the relationships between the columns 231-235 in logical tables 221-222, represented by fields of the logical tables 221-222. In some embodiments, the logical tables 221-222 may only include a subset of the records of the columns 231-235. The database server 111 may in some embodiments maintain columns 231-235 as tables with different relationships than the fields in the logical tables 221-225. For example, as illustrated in FIG. 2A, the logical table 221 may include columns 231 and 232, but the columns are part of two different tables each with a single column in the database server 111.

In FIG. 2B, columns 251-255 represent a physical schema 111a found on database server 111. Applications 121 and 122 may access data in the columns in the physical schema 111a, columns 251-255, through tables in logical databases 241 and 242, respectively. The logical databases 241 and 242 may share data in the database server 111 in some embodiments. As shown in FIG. 2B, logical tables of the logical databases 241-242 may each have a different logical schema 111b, i.e., a different mapping of columns 251-255. Logical tables in different logical databases may share some or all fields of data. For example, as illustrated in FIG. 2B, a logical table 223 of the logical database 241 shares columns 251-252 with logical table 226 of logical database 242. Similarly, logical tables 224 and 225 share columns 254-255. By maintaining relationships between data at a higher level in logical tables of logical databases as logical schema 111b (not shown in the figure), the disclosed techniques help avoid restricting data to one certain model, allowing for isolation of data from the model. Such higher-level relationships allow for removal of a certain relationship defined in a logical table (e.g., logical table 223), or for an update of the relationship defined in the logical table to not result in deletion of data or maintaining duplicate copies of the data for the new relationship between fields of the data. For example, if the logical table 223 is deleted from the logical schema 111b of logical database 241, the data in column 251 is unaltered and can be still accessed through relationships described in logical table 226. Similarly, an update to a logical schema, for instance by including additional fields in a logical table (e.g., logical table 223), may not impact the same fields used in other logical tables in the same or different logical databases (e.g., logical table 224 or the tables in logical database 242). For example, merging logical tables 223 and 224 into a single logical table to include columns 251-255 does not necessarily affect the relationships maintained by logical table 225 and logical table 226 with columns 251-255.

Figure 3:
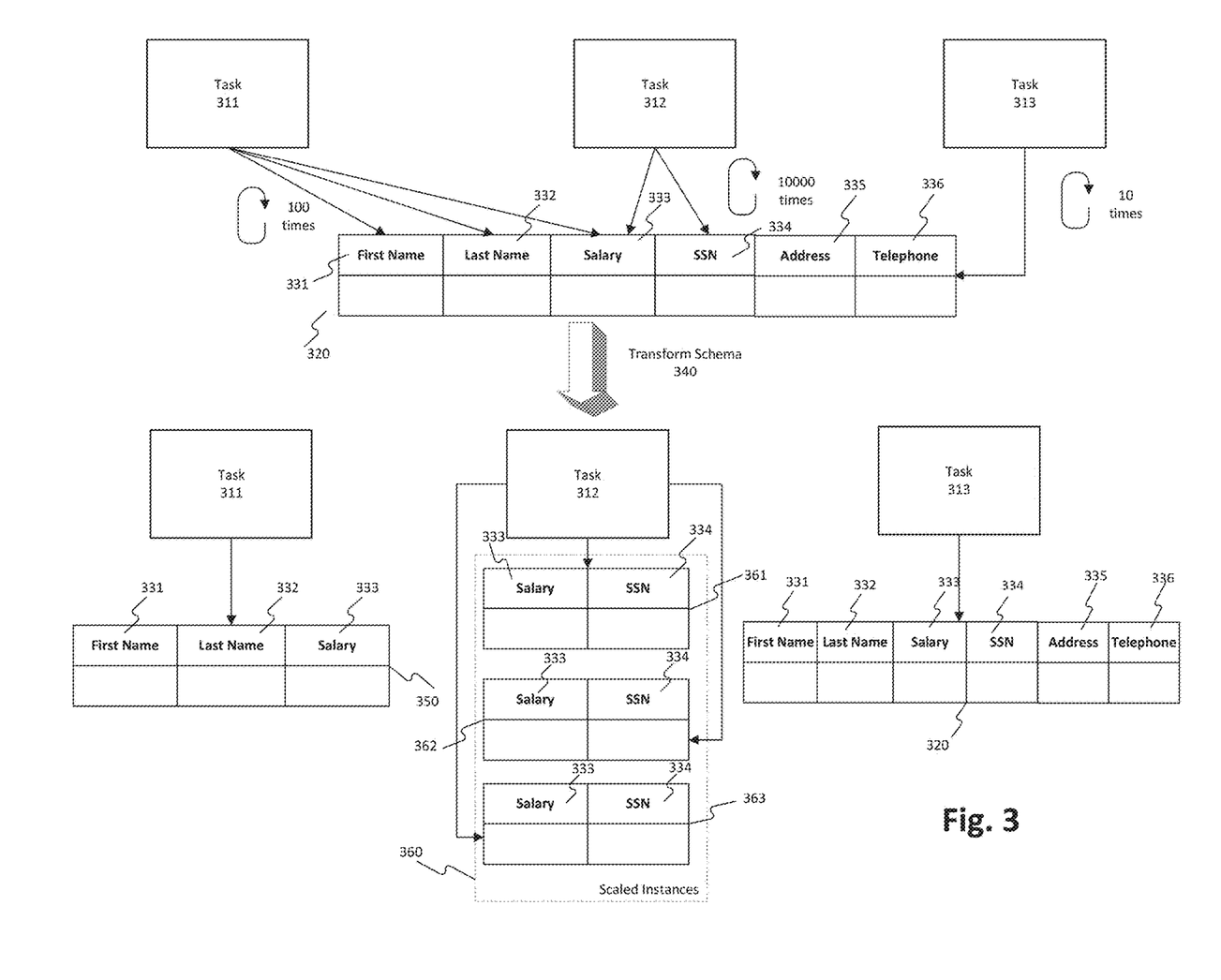
FIG. 3 is a flow diagram of an exemplary database schema update process based on increased access to data identified in certain data fields of the database schema, according to some embodiments of the present disclosure.

FIG. 3 is a flow diagram of an exemplary database schema update process based on increased access to data in certain fields of the database schema, according to some embodiments of the present disclosure. As illustrated, FIG. 3 depicts an interaction between three different tasks 311-313 belonging to one or more applications (e.g., application group 120) that access the abstracted data via application data model 112 (not shown) represented by a table 320. The table 320 may be represented, for example, by three different copies of logical tables in three different logical databases with the same relationship to columns 331-336 in the database server 111 (not shown).

As shown in FIG. 3, tasks 311, 312, and 313 may be interacting with table 320 a number of times, such as 100, 10,000, and 10 times, respectively. The tasks 311-313 may interact with table 320 at different rates by interacting their respective number of times within a fixed period of time. The tasks 311-313 may interact with a different subset of columns 331-336 of the logical table 320. For example, task 311 may access columns 331-333 of table 320, task 312 may access columns 333-334 of logical table 320, and task 313 may access all columns 331-336 of logical table 320.

The access to the data in table 320 may be captured by the access-pattern processor 113. The captured access patterns may be from various sources (e.g., tasks 311-313) and various patterns of access, which may include different subsets of columns accessed by the tasks 311-313. ADS 110 may send the captured access patterns in access-pattern processor 113 to the feedback loop 114 as part of the transform schema step 340 to help evaluate any recommended updates to the physical schema 111a or logical schema 111b which are used to return the data represented by table 320. The feedback loop 114 may recommend updates to the physical schema 111a or logical schema 111b based on the fields of table 320 being accessed by the tasks 311-313 and the number of times the data in those fields are accessed. The feedback loop 114 may update the physical schema 111a or logical schema 111b, in some embodiments, only to include relationships of the columns which are accessed by a task.

As an example of updating the logical schema 111b, the feedback loop 114 may add a new logical table with a subset of, or all, columns of the table 320 accessed by a task (e.g., task 311 or task 312) as a new table. The new logical table may be created as soon as feedback loop 114 detects the existence of task 311 being created, or after observing task 311 for some time. The creation of task 311 may be associated with a new application model, for instance, when a new application is created or when a new record is added to an existing application. Alternatively, task 311 may be created when a new report is created that accesses the new subset of tables, such as data fields 331-336. Task 311 may also be created, for example, when any new set of data fields is accessed or when newly created data fields are accessed. The new table may be a logical table pointing to the same data in the database server 111 as table 320. In some embodiments, the feedback loop 114 may also replicate a relationship to help with handling an increased access rate.

Newly created task 311 may also result in an update of the physical schema 111a, for instance by creating a new physical table. For example, feedback loop 114 may detect the need to ensure that a sudden increase in load from execution of task 312 or task 313 does not affect the performance of task 311 and, thus, horizontally scale by creating a new physical table containing only the data fields accessed by task 311. The creation of this new physical table can isolate the performance of task 311 from other tasks, such as task 312 or task 313.

As shown in FIG. 3, task 312 may be accessing only columns 333 and 334, and in some embodiments, the disclosed techniques will improve application performance by updating the logical schema 111b to have a new logical relationship with just those two columns, and thus speed up access to data (e.g., by loading fewer columns of data into memory). As an additional advantage, creating this logical relationship with just those two columns (i.e., 333, 334) allows the process of replicating the data to be performed much more quickly, since only two columns need to be replicated when multiple physical copies of the data in columns 333 and 334 need to be created to handle increased access.

Additionally, if the write operations to a table result in locking that table, then a write operation to either column 333 or 334 by task 312 could result in locking the entire table 320, thus restricting a read or write access to columns 331 and 332 by other tasks (e.g., task 311). Further, because a write operation may be a slower operation than a read operation, it may be advantageous to update the schema (physical schema 111a and/or logical schema 111b) to permit reading and writing associated data simultaneously. According to some embodiments, the disclosed techniques can improve database performance by updating the physical schema 111a to split the columns into separate tables based on access patterns, thus permitting applications to read data from some columns without having to wait for writes of other columns to complete.

Also, the feedback loop 114 may identify when data in one or more particular columns is accessed frequently relative to access to other data in the same physical table, or accessed more than a certain threshold number of times, and improve performance by creating physical replicas of the frequently accessed columns. For instance, if data in columns 333 and 334 is being accessed some number of times (for instance 10,000 times) by task 312 results in a certain threshold being met, the feedback loop 114 may update the physical schema by replicating the data in columns 333 and 334 into multiple physical tables consisting of the same columns, i.e., physical tables 361-363. Inclusion of only columns 333-334 in the new scaled instances 360 may be important when scaling to avoid duplication of data (e.g., data in columns 331 and 332), which is not utilized by a certain task (e.g., task 312), resulting in saved storage space. In some embodiments, one or more of scaled instances 360 may be created on separate servers, to improve the speed of access to and updates of data when access and update requests are distributed roughly equally to the separate servers.

In some embodiments, a table may be split as a precautionary measure. For example, task 311 may have accessed columns 331-333 in table 320 100 times, a number that might ordinarily be below a threshold to result in transformation of the physical schema 111a or logical schema 111b, but still results in a new relationship. The feedback loop 114 may create a new relationship for task 311, even when the threshold for a number of repeated access requests to a set of columns is not crossed because of a certain style of access patterns, for instance, three-quarters of access requests seek only data from columns 331 and 332. Consistent with above embodiments, table 350 may be a physical table or a logical table. A logical table may be created as soon as the feedback loop detects that task 311, for example, exists. A physical table may be created to isolate task 311 from other tasks (e.g., to ensure that a sudden increase in load from task 312 or task 313 do not affect the access data in fields represented by the newly created physical table).

The transform schema 340 step conducted by feedback loop 114 may be evaluated based on the access patterns of tasks 311-313 in access-pattern processor 113 and other similar tasks' access patterns. In some embodiments, the feedback loop 114 may use a machine learning model trained using different tasks with different access patterns to predict potential changes which might be made to the schema of logical table 320. For example, feedback loop 114 may use a machine learning model to predict that task 311's access patterns to table 320 are potentially resulting in slowing down task 313 and thus create a new physical table 350 to provide faster data access to task 313. Task 313 may access table 320 only a few times and may continue to access the data in the database server 111 via table 320 after table 350 is created. Alternatively, the feedback loop 114 may transform the physical schema 111a by creating a new physical table with only columns 331-336 separated from the other columns in table 320 as part of the transformed schema 340 step.

Figure 4:
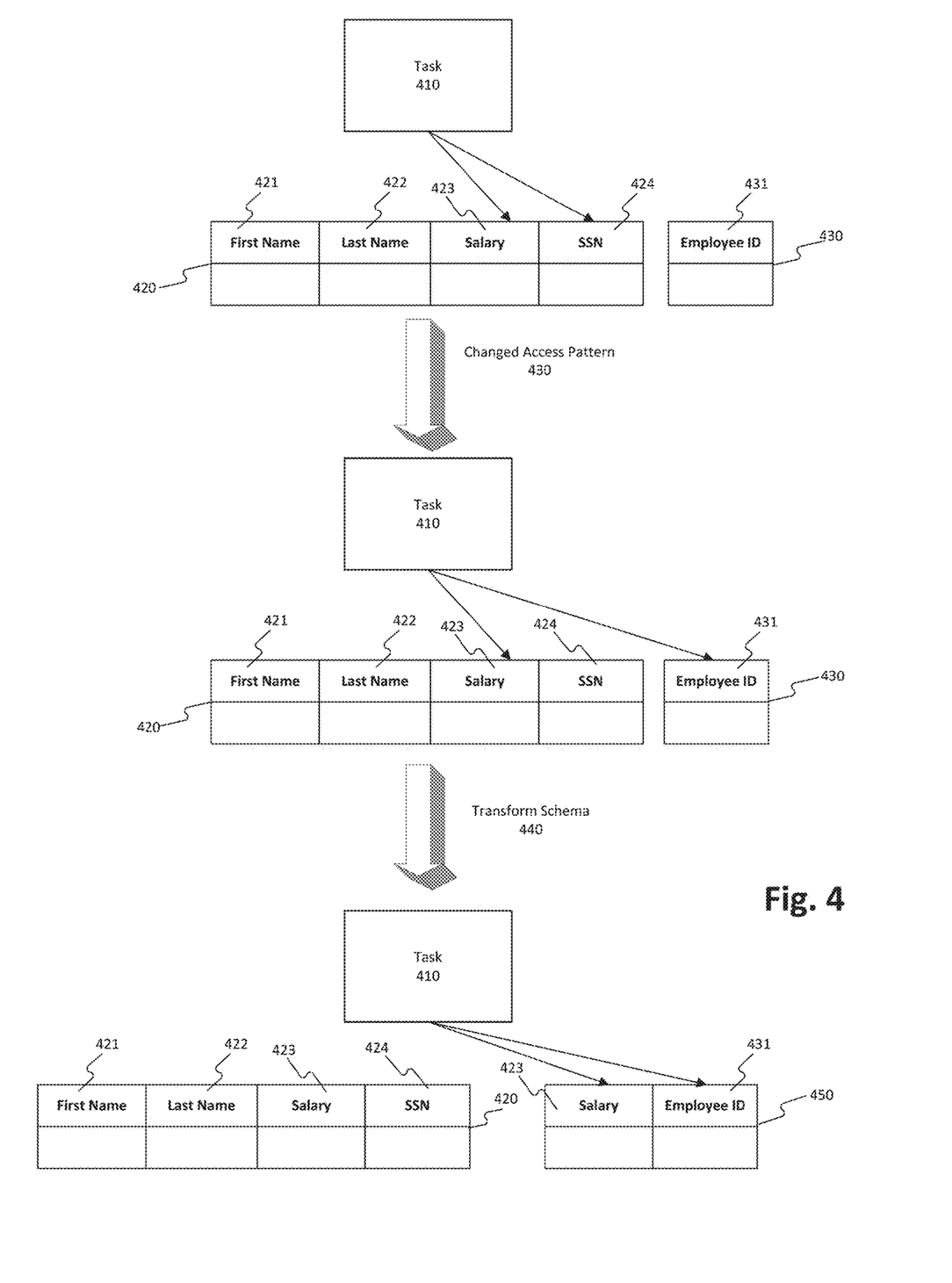
FIG. 4 is a flow diagram of an exemplary database schema update process based on changes to access patterns to data fields of the database schema, according to some embodiments of the present disclosure.

FIG. 4 is a flow diagram of an exemplary database schema update process based on changes to access patterns to data fields of the database schema, according to some embodiments of the present disclosure. The figure shows an interaction between, for example, a task 410 belonging to an application (e.g., application 121) with a database schema in the application data model 112 (not shown) represented by tables 420 and 430, which could be tables in either or both of the physical schema 111a or logical schema 111b. The ADS 110 may transform the database schema automatically to adjust to the changes in the code representing task 410. Such an automatic update of the database schema relieves application developers from the need to envision every potential update to the database schema prior to the initial development of the application or prepare tables defining all relationships between fields of data in the database server 111 which may be necessitated by updates to the application. It also may help with easing the development process by letting ADS 110 handle database management and update application logic without having to address scalability issues during the application development process. Finally, it saves time and minimizes the potential for mistakes introduced by application developers having to manually redesign the database schema and create all necessary relationships.

As shown in FIG. 4, task 410 has a changed access pattern 430, resulting from the change of database access requests by task 410 from columns 423-424 to columns 423 and 431. In some embodiments, the change of database access requests by task 410 may be a result of an update to software code associated with task 410. In some embodiments, column 431 and table 430 may not have existed prior to the change of access pattern by task 410. In some embodiments, the change of database access requests by task 410 may be a result of a change in usage by the end users of the application, resulting in the application requesting different groupings of data from the database. The ADS 110 may detect the change in access pattern for a certain task (e.g., task 410) and may request the feedback loop 114 to make an evaluation regarding an update to the database schema. Such an evaluation may result in the update of the database schema by merging fields of tables accessed as part of the changed access pattern to create a new physical or logical table. Updating either or both of the physical schema 111a and logical schema 111b can be performed without changing the application data model 112. Thus, applications in application group 120, and their users, may continue to access data in the database server 111 as if no change to the physical schema 111a or logical schema 111b had been made. As shown in FIG. 4, the database schema represented by the tables 420 and 430 is transformed by the feedback loop 114 in the transform schema 440 step to create a new relationship represented by physical table 450. Table 450 may also be a logical table sharing column 423 with table 420. The updated database schema from the application data model 112 may include a new logical table 450 which provides quick and easy access to data by task 410 for similar reasons, as described in FIG. 3. In addition, in some embodiments, the transform schema 440 step may additionally transform a physical table, such as transforming table 420 (assuming for this example that it is physical) to omit column 423 based on changed access patterns. The omission can be triggered, for example, when no other task (e.g. a report, an application model) uses column 423.

Figure 5:
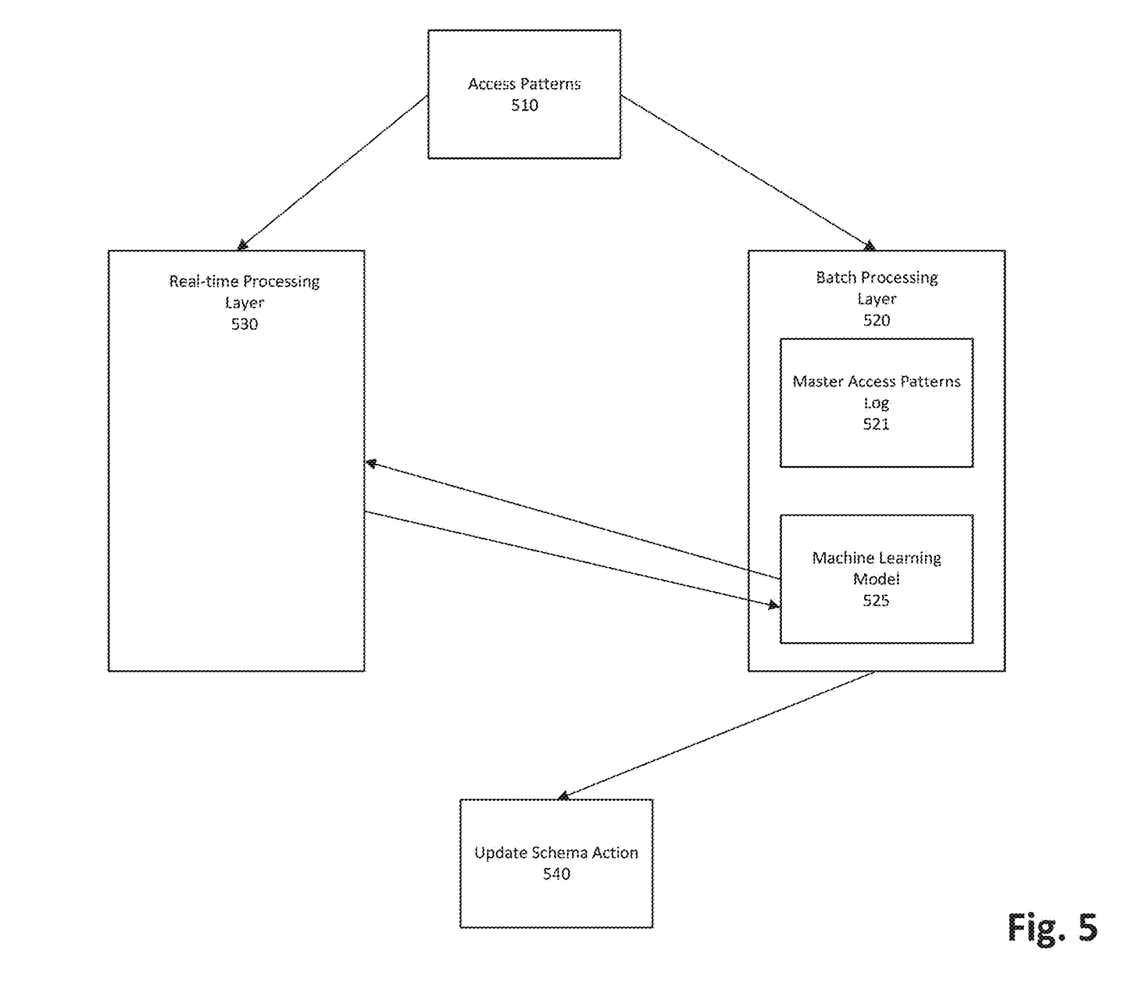
FIG. 5 is a block diagram of an exemplary architecture and flow for an access-pattern processor and feedback loop, according to some embodiments of the present disclosure.

FIG. 5 is a block diagram of an exemplary architecture of the access-pattern processor 113 and the feedback loop 114, according to some embodiments of the present disclosure. The access-pattern processor 113 may be comprised of components including batch processing layer 520 and real-time processing layer 530 to handle access to the data in the database server 111 and changes prompted by one or more access patterns in a collection of access patterns 510. The access-pattern processor 113 upon receiving the access patterns 510 may share them with the batch processing layer 520 and the real-time processing layer 530 for batch processing and real-time processing of the access patterns, respectively. The batch processing layer 520 and the real-time processing layer 530 may process each access pattern in the collection of access patterns 510 to determine which tables or fields of the database schema from the application data model 112 need to be queried for data in the database server 111. The evaluation of what data to access is based on an analysis of an access pattern in the collection of access patterns 510. The batch processing layer 520 and the real-time processing layer 530 may use a machine learning model to evaluate the tables to be accessed for a particular access pattern. The machine learning model may make a predictive analysis of the best tables to use to access the requested data identified in the access pattern. In some embodiments, machine learning is applied to an analyzed access pattern to recommend or make changes to the physical schema 111a or logical schema 111b. Consistent with above embodiments, the machine learning may utilize a variety of tools, such as GOOGLE AI HUB, GOOGLE AUTOML TABLES, GOOGLE CLOUD INFERENCE API, AMAZON SAGEMAKER, AZURE MACHINE LEARNING, TENSORFLOW, etc.

The batch processing layer 520 may include a master access patterns log 521 to log all patterns. The master access patterns log 521 may include all the access patterns in the collection of access patterns 510 and, in some embodiments, all previously received access patterns. The batch processing layer 520 upon receipt of the collection of access patterns 510 may store them in the master access patterns log 521. The batch processing layer 520 may input the access patterns in master access patterns log 521 into a machine learning model to identify use of a new task of an application. Upon identifying use of a new task, batch processing layer 520 may train the machine learning model to prepare machine learning model 525 and deploy it to real-time processing layer 530 to recognize the access patterns of the new task. The batch processing layer 520 may also send a machine learning model 525 when there is no new task and in turn no new access patterns for newly created or modified physical or logical tables. For example, the batch processing layer 520 may make an initial assumption of which tables to utilize for a particular access pattern and later update it based on a number of factors including, for example, query execution speed, amount of memory utilized in loading data associated with an access pattern, the frequency with which particular fields or columns are accessed, and others. The batch processing layer 520 may also update the logical tables in the database schema to handle the changes in access patterns generated by a task (e.g., task 311). The batch processing layer 520 may further initiate an update schema action 540 to update the physical tables on the database server 111. In some embodiments, the batch processing layer 520 may request an update schema action 540 to update the physical or logical tables in the database even when it did not identify a new task. For example, a task (e.g., task 311) requesting a subset of columns of a table may result in the batch processing layer 520 making a request to update schema action 540 to split a table (e.g., table 320), thereby creating a new table (e.g., table 350) that only includes the subset of columns (e.g., columns 331-333), thus preserving available memory or to allow more data to be loaded into memory related to the subset of columns to be accessed by the task. The update schema action 540 may also help determine whether to drop the original table (e.g., table 320) upon receiving a request to split a table into multiple tables. In some embodiments, update schema action 540 may also determine if a table needs to be replicated multiple times (e.g., scaled instances 360) to scale the application to handle multiple data requests to the same columns (e.g., columns 333 and 334) simultaneously. Upon receiving an access pattern, real-time processing layer 530 may determine the tables to access to serve the data of the database server 111 requested by a task (e.g., task 311).

In some embodiments, the batch processing layer 520 and the real-time processing layer 530 may utilize the tables of a database schema to act as a hybrid transactional/analytical processing (HTAP) database. The system 100 may determine to operate a table in the real-time processing layer 530 or the batch processing layer 520 based on the evaluation of the feedback loop 114. A single database (e.g., logical database 241) may operate certain tables in a transaction mode with real-time responses and other tables in an analytical mode with batch processing of data. The system 100 may achieve this result by using a single database server with two physical tables that each access the same data (e.g., columns 251-255), one of which is placed in the batch processing layer 520 and the other in the real-time processing layer 530. In order to handle real-time processing of data, the physical tables may be replicated to handle multiple requests. For example, the different tables in scaled instances 360 may each be responsible for handling different requests to access data in the database server 111, such as requests that come from separate applications, separate groups of users of an application, etc. In some embodiments, batch processing may also require replication of data to handle the processing of large amounts of data in an analytical mode. In some embodiments, an access request may result in accessing data from both the batch processing layer 520 and the real-time processing layer 530. The system 100 may also allow writing to tables in both the batch processing layer 520 and the real-time processing layer 530 in a single request. As the underlying physical structures referenced by logical tables (e.g., logical tables 223 and 226) in the batch processing layer 520 and the real-time processing layer 530 refer to the same columns (e.g., columns 251 and 252), both layers could write to the database at the same time. This allows for handling data in the database simultaneously as an online transaction processing (OLTP) system that conducts a significant number of read/write transactions and online analytical processing (OLAP) system that conducts mostly read transactions and analysis of data. Access to the batch and real-time processing layers 520 and 530 helps simultaneously conduct read and analysis of data while conducting write transactions using the respective layers.

Figure 6:
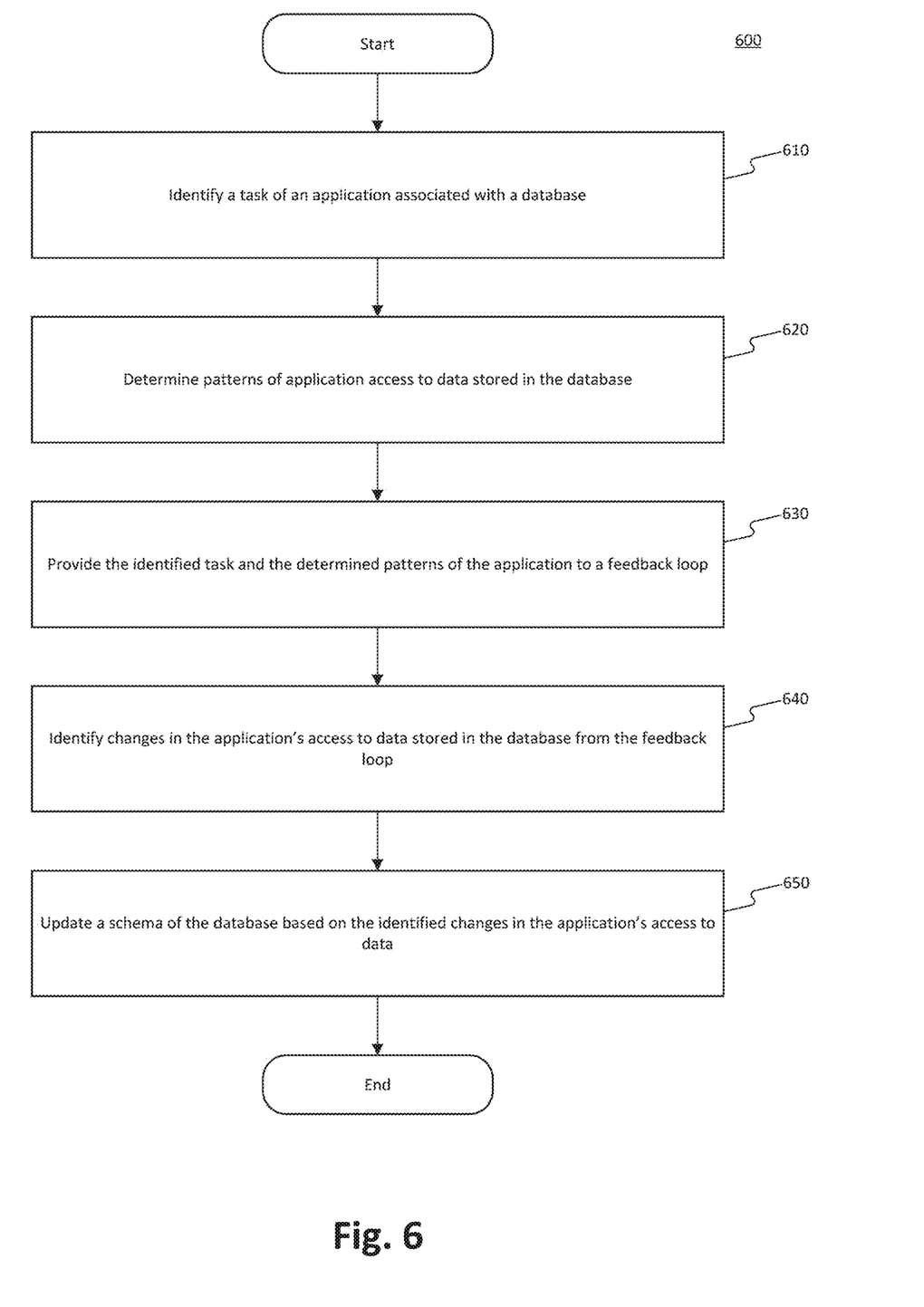
FIG. 6 is a flowchart depicting an exemplary method for runtime updates of a database schema based on data access patterns to a database from an application, according to some embodiments of the present disclosure.

FIG. 6 is a flowchart depicting an exemplary method 600 for runtime updating of a database schema (e.g., physical schema 111*a* and logical schema 111*b* in the database server 111) based on data access patterns to a database from an application (e.g., application 121), according to some embodiments of the present disclosure. The steps of method 600 may be performed by the system 100 for purposes of illustration. It will be appreciated that the illustrated method 600 can be altered to modify the order of the steps and to include additional steps.

In step 610, the system 100 may identify a task (e.g., task 312) of an application (e.g., application 121) associated with a database (e.g., logical database 241). The identification of the task in an application may occur using a machine learning model (e.g., machine learning model 525), consistent with above embodiments. The machine learning model may help in the identification of a grouping of database access requests occurring by the execution of one or more functions within an application (e.g., application 121), which together may be identified as a task. An identified task may have a repeated set of calls to the database with a subset of varying calls based on different conditional code paths within a task. Thus, a task may be defined by a group of access patterns sets, each defining one of multiple possible execution paths. The system 100 may, at a later time, determine an identified task with different paths of execution as separate tasks.

In addition, the system 100 may utilize the ADS 110 to recognize various calls for data in the database server 111 to identify use of a new task. Several different functions in the code for an application may call the same set of fields of a table (e.g., columns 251, 252). The system 100 may identify a new task, for example, when a new report is created or an application is modified to create a new aggregation of data for use in a table, based on recognition of use of a new set of data fields by the access-pattern processor 113. In some embodiments, the application may directly send a notification about a task to access-pattern processor 113.

In step 620, the system 100 may observe patterns of access to data stored in the database (e.g., logical database 241) by the application. The system 100 may delegate the access pattern observation to the access-pattern processor 113 to determine the access patterns.

In step 630, the system 100 may provide the identified task (e.g., task 311) and the observed patterns of the application to a feedback loop 114. The ADS 110 of the system 100 may share the logged access patterns in access-pattern processor 113. In some embodiments, the access patterns may be determined by the access-pattern processor 113 from the database access requests received by the ADS 110 from an application task. The task may also be identified by the access-pattern processor 113. In some embodiments, the task making the database request may share the task identity directly with the feedback loop 114.

In step 640, the system 100 may identify changes in the application's access to data stored in the database from the feedback loop 114. The system 100 may be equipped to identify various access pattern changes, including an increase or decrease in the frequency of access, change of code path for accessing data, change of fields accessed, modification of groups of fields accessed together, etc. The system 100 may identify more than one of the listed changes simultaneously. The system 100 may behave differently in some embodiments to the changes to access patterns. The system 100 may immediately react upon identification of certain changes to data access, or may wait for a period of time or a certain number of occurrences of changes to data access, to identify the changes in data access as a changed access pattern. In some embodiments, the change in access patterns may produce a difference in the time required to access data, the amount of memory utilized, or the amount of data transferred in response to the data access request. The ADS 110 of the system 100 may help identify the changes to the access patterns based on the responses from the feedback loop 114.

In some embodiments, the logical tables (e.g., logical tables in logical databases 241 and 242) may represent a relationship between tables in multiple databases, where the logical tables aggregate data from columns in physical tables in one or more databases in the database server 111. The logical tables may be used to create a bi-directional relationship between two physical tables, and thus may be used to write to either table using data in the other table as the key. Such logical tables may also allow for executing the same query in different databases, which may not store the same data, and yet return the same data by accessing the required columns from both databases. The same data includes both located locally in the database being queried and the data in another database which linked to the database being queried using a logical table. Such an ability to access same data from different databases helps with avoiding copying of data between databases which needs to be constantly synced to have access to the latest version of the data. Further ability to use multiple databases to access the same data can help reduce the load caused by database queries on one database. The bi-directional relationship, thus, allows a query to be executed against logical tables in two different databases, neither of whose physical tables contain the same set of data fields, and yet still return the same data when executed on either database. The feedback loop 114 may also identify changes in the bi-directional relationship between tables in different databases.

Changes to relationships between data fields in the database server 111 can be logged for use in an audit system, which tracks changes to the relationships over time. In some embodiments, ADS 110 can maintain a record of all changes to a database schema at the field level over time in a log. This log of changes can form the basis for an auditing system that keeps a record of such data. ADS 110 maintaining a record of database schema changes may maintain the past relationships between fields of data in database server 111 by having a built-in field-level auditing, for example, which can keep a log of all the changes to the database schema. The relationship changes may also include changes to a bi-directional relationship which may be tracked by the auditing system. The auditing system may keep track of the changes to each schema irrespective of the existence of a bi-directional relationship between tables in different databases. In some embodiments, ADS 110 may include field level auditing by default or upon selection by a user.

The access-pattern processor 113 may keep a log of the database schema changes along with the log of access patterns to access data in the database server 111. In some embodiments, the access patterns may be associated with a certain definition of a database schema, and thus any changes to the database schema may be logged and associated with different versions of database schemas. The different versions of database schemas may be associated with different sets of access patterns and may result in utilizing past database schema relationships to serve the audited data.

In step 650, the system 100 may update a schema (e.g., physical schema 111a or logical schema 111b in the database server 111) of the database based on the identified changes in the application's access to data. The system 100 may update the physical schema 111a by splitting a physical table (e.g., table 320) into multiple logical tables (e.g., table 350, 360). In some embodiments, the system 100 may merge groups of columns (e.g., columns 424, 431) from different tables (e.g., tables 420, 430) to update either the physical schema 111a or logical schema 111b to form a new physical or logical table (e.g., table 450). The system 100 may update the physical schema 111a by replicating a table (e.g., table 360) and horizontally scaling (e.g., scaled instances 360) automatically. The system 100 may change the physical schema 111a without any locks applied, unlike a regular RDBMS. The system 100 may achieve this by batch processing data and field changes using the batch processing layer 520 to, for example, build new physical tables in the background and atomically updating logical tables to reference the new physical tables when the changes are complete. The system 100 may discard old physical tables when they are no longer used.

The system 100 update schema operation may address a specific application or task (e.g., task 311). In some embodiments, the system 100 may update the physical schema 111a only to affect a specific query or set of queries. For example, upon determining that certain columns within a table have been accessed together with increased frequency (e.g., columns 331-333) by one or more queries, a new table (e.g., table 350) may be formed with the columns with increased access but the original table (e.g., table 320) with all the existing tables may still exist. The determined update to the database schema may help in faster access to data and may result in the usage of less memory and transfer of lesser data from the database server 111, making the system 100 operate more quickly.

Various operations or functions are described herein, which may be implemented or defined as software code or instructions. Such content may be directly executable (e.g., in "object" or "executable" form), source code, or difference code (e.g., in "delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, hard disks or drives, tape disks or drives, read-only memories (ROMs), random access memories (RAMs), EPROMs, EEPROMs, magnetic or optical cards, or any type of media suitable for storing electronic instructions, each coupled to a computer system bus.

Embodiments of the present disclosure may be implemented with computer executable instructions. The computer-executable instructions may be organized into one or more computer-executable components or modules. Aspects of the disclosure may be implemented with any number and organization of such components or modules. For example, aspects of the disclosure are not limited to the specific computer-executable instructions or the specific components or modules illustrated in the figures and described herein. Other embodiments may include different computer-executable instructions or components having more or less functionality than illustrated and described herein.

Computer programs based on the written description and methods of this specification are within the skill of a software developer. The various programs or program modules can be created using a variety of programming techniques. For example, program sections or program modules can be designed by means of JavaScript, Scala, Python, Java, C, C++, assembly language, or any such programming languages, as well as data encoding languages (such as XML, JSON, etc.), query languages (such as SQL, GraphQL, Datalog, SPARQL), presentation-related languages (such as HTML, CSS etc.) and data transformation language (such as XSL). One or more of such software sections or modules can be integrated into a computer system, non-transitory computer readable media, or existing communications software.

The words "comprising," "having," "containing," and "including," and other similar forms are intended to be equivalent in meaning and be interpreted as open ended, in that, an item or items following any one of these words is not meant to be an exhaustive listing of such item or items, or meant to be limited to only the listed item or items. In addition, the singular forms "a," "an," and "the" are intended to include plural references, unless the context clearly dictates otherwise.

Having described aspects of the embodiments in detail, it will be apparent that modifications and variations are possible without departing from the scope of aspects of the invention as defined in the appended claims. As various changes could be made in the above constructions, products, and methods without departing from the scope of aspects of the invention, it is indented that all matter contained in the above description and shown in the accompanying drawings shall be interpreted as illustrative and not in a limiting sense.

What is claimed is:

1. A non-transitory computer readable medium including instructions that, when executed by at least one processor, cause the at least one processor to perform operations for automatic and efficient updating of a database, the operations comprising:
    generating, through a machine learning process, an identification of a task of an application accessing data stored in the database, wherein the machine learning process includes monitoring activity of the application accessing the data stored in the database;
    determining patterns of the application's access to the data stored in the database;
    providing the identified task and the determined patterns of the application to a feedback loop; and
    automatically updating a schema of the database based on identified characteristics of the determined patterns of the application's access to the data stored in the database from the feedback loop.

2. The non-transitory computer readable medium of claim 1, wherein the identified characteristics of the determined patterns of the application's access to the data stored in the database include a change in at least one of the determined patterns.

3. The non-transitory computer readable medium of claim 2, wherein the change in at least one of the determined patterns is based on a new application having been created.

4. The non-transitory computer readable medium of claim 2, wherein the change in at least one of the determined patterns is based on the detection of a set of data associated with a type of user device.

5. The non-transitory computer readable medium of claim 2, wherein the change in at least one of the determined patterns is based on changes in the application's access to the data stored in in the database.

6. The non-transitory computer readable medium of claim 5, wherein the changes in the application's access to the data stored in the database include a new way of accessing the data stored in the database.

7. The non-transitory computer readable medium of claim 5, wherein the changes in the application's access to the data stored in the database include an increased frequency of a way to access the data stored in the database.

8. The non-transitory computer readable medium of claim 2, wherein the change in one of the determined patterns includes updating access to the data stored in the database.

9. The non-transitory computer readable medium of claim 8, wherein the updating access to the data stored in the database is at an individual data field level in the database.

10. The non-transitory computer readable medium of claim 8, wherein the updating access to the data stored in the database includes granting a user device request for data access to the application.

11. The non-transitory computer readable medium of claim 8, wherein the updating access to the data stored in the database includes sharing the application's access to the data with another application.

12. The non-transitory computer readable medium of claim 1, wherein automatically updating the schema of the database includes partitioning of a physical table across machines.

13. The non-transitory computer readable medium of claim 1, wherein automatically updating the schema of the database includes moving at least a portion of the data stored in the database to a specific location.

14. The non-transitory computer readable medium of claim 1, wherein automatically updating the schema of the database includes migrating at least a portion of the data stored in the database from one application data model to another application data model.

15. The non-transitory computer readable medium of claim 14, wherein migrating the at least the portion of the data stored in the database to the application data model is conducted in a background of the application.

16. The non-transitory computer readable medium of claim 1, wherein automatically updating the schema of the database includes replicating the database and the application accessing the data stored in the database.

17. The non-transitory computer readable medium of claim 1, wherein automatically updating the schema of the database includes updating one or more schemas associated with a set of queries for accessing the data stored in the database.

18. The non-transitory computer readable medium of claim 1, wherein automatically updating the schema of the database includes updating the database without locks.

19. A computer implemented method for automatic and efficient updating of a database, the method comprising:
    generating, through a machine learning process, an identification of a task of an application accessing data stored in the database, wherein the machine learning process includes monitoring activity of the application accessing the data stored in the database;
    determining patterns of the application's access to the data stored in the database;
    providing the identified task and the determined patterns of the application to a feedback loop; and
    automatically updating a schema of the database based on identified characteristics of the determined patterns of the application's access to the data stored in the database from the feedback loop.

20. A non-transitory computer readable medium including instructions that, when executed by at least one processor, cause the at least one processor to perform operations for automatic and efficient updating of a database schema, the operations comprising:
    identifying one or more changes to an application's code, wherein the application is monitored continuously for changes to the application's code in a codebase;
    determining one or more changes to data access activity associated with the one or more changes to the application's code; and
    analyzing an impact of the one or more changes to the data access activity; and
    automatically updating a schema of the database based on the identified one or more changes to the application's code, wherein the schema updates are determined based on level of impact of the one or more changes to the data access activity associated with the one or more changes to the application's code.

* * * * *

UNITED STATES PATENT AND TRADEMARK OFFICE
CERTIFICATE OF CORRECTION

| | | |
|---|---|---|
| PATENT NO. | : 11,687,520 B1 | Page 1 of 1 |
| APPLICATION NO. | : 17/403474 | |
| DATED | : June 27, 2023 | |
| INVENTOR(S) | : Antonio Andrade Garcia et al. | |

It is certified that error appears in the above-identified patent and that said Letters Patent is hereby corrected as shown below:

In the Claims

In Claim 5, Column 21, Line 38, change "stored in in the database" to --stored in the database--.

Signed and Sealed this
Seventeenth Day of October, 2023

*Katherine Kelly Vidal*

Katherine Kelly Vidal
*Director of the United States Patent and Trademark Office*